(12) United States Patent
Lindberg (10) Patent No.: US 7,710,452 B1
(45) Date of Patent: May 4, 2010

(54) REMOTE VIDEO MONITORING OF NON-URBAN OUTDOOR SITES

(75) Inventor: Eric G. Lindberg, Plymouth, MN (US)

(73) Assignee: Eric Lindberg, Plymouth, MN (US)

(*) Notice: Subject to any disclaimer, the term of this patent is extended or adjusted under 35 U.S.C. 154(b) by 923 days.

(21) Appl. No.: 11/376,832

(22) Filed: Mar. 16, 2006

Related U.S. Application Data (60) Provisional application No. 60/662,205, filed on Mar. 16, 2005.

(51) Int. Cl.
  *H04N 9/47* (2006.01)
  *G08G 1/00* (2006.01)

(52) U.S. Cl. .................................. 348/149; 701/117

(58) Field of Classification Search ............. 348/14.2, 348/14.3, 148–159; 701/117
See application file for complete search history.

(56) References Cited

U.S. PATENT DOCUMENTS

| | | | |
|---|---|---|---|
| 3,100,473 A | 8/1963 | Kissel | |
| 3,304,911 A | 2/1967 | Hakata et al. | |
| 3,803,571 A | 4/1974 | Luz | |
| 3,914,540 A | 10/1975 | Slater | |
| 4,092,673 A | 5/1978 | Adams | |
| 4,155,100 A | 5/1979 | Hill, Jr. | |
| 4,337,726 A | 7/1982 | Czekajewski et al. | |
| 4,574,734 A | 3/1986 | Mandalaywala et al. | |
| 4,651,144 A | 3/1987 | Pagano | |
| 5,111,291 A | 5/1992 | Erickson et al. | |
| 5,546,439 A | 8/1996 | Hsieh | |
| 5,568,183 A | 10/1996 | Cortjens et al. | |
| 5,581,276 A | 12/1996 | Cipolla et al. | |
| 5,596,994 A | 1/1997 | Bro | |
| 5,598,209 A | * 1/1997 | Cortjens et al. | 348/211.12 |

(Continued)

FOREIGN PATENT DOCUMENTS

WO    WO2004095386    11/2004

OTHER PUBLICATIONS

Banner®, *Vehicle Detection Sensor*, M-Gage™ Q7M Flat-Pak, pp. 1-8, Sep. 2004.

(Continued)

*Primary Examiner*—Nhan T Tran
*Assistant Examiner*—Trung Diep
(74) *Attorney, Agent, or Firm*—Patterson, Thuente, Skaar & Christensen, PA (57) ABSTRACT

A method of remotely detecting rule violations at an outdoor site according to one aspect of the invention includes installing a self-contained VMU at the outdoor site near ground elevation, including affixing a chassis of the VMU to a permanent mount. The VMU is operated in a low-power standby mode that includes passively monitoring an ambient magnetic field at the outdoor site to detect a disturbance caused by a presence of a substantial ferrous object. In response to a detection of a disturbance in the ambient magnetic field, the VMU exits the low-power standby mode and initiates an active operating mode. The active operating mode includes operating a video camera by the VMU to capture video data; and wirelessly transmitting a signal representing at least a portion of the video data to a computer network. The video data is received by a remote node in the computer network via the computer network, and stored in association with a database record.

31 Claims, 8 Drawing Sheets

U.S. PATENT DOCUMENTS

| | | |
|---|---|---|
| 5,619,183 A | 4/1997 | Ziegra et al. |
| 5,708,767 A | 1/1998 | Yeo et al. |
| 5,717,379 A | 2/1998 | Peters |
| 5,737,491 A | 4/1998 | Allen et al. |
| 5,760,917 A | 6/1998 | Sheridan |
| 5,761,280 A | 6/1998 | Noonen et al. |
| 5,809,161 A | 9/1998 | Auty et al. |
| 5,812,054 A | 9/1998 | Cohen |
| 5,815,080 A | 9/1998 | Taguchi |
| 5,816,256 A | 10/1998 | Kissinger et al. |
| 5,821,945 A | 10/1998 | Yeo et al. |
| 5,838,252 A | 11/1998 | Kikinis |
| 5,838,682 A | 11/1998 | Dekelbaum et al. |
| 5,852,754 A | 12/1998 | Schneider |
| 5,861,804 A | 1/1999 | Fansa et al. |
| 5,870,138 A | 2/1999 | Smith et al. |
| 5,886,753 A | 3/1999 | Shinyegaito et al. |
| 5,892,442 A | 4/1999 | Ozery |
| 5,917,405 A | 6/1999 | Joa |
| 5,949,551 A | 9/1999 | Miller et al. |
| 5,962,210 A | 10/1999 | Hahm et al. |
| 5,987,519 A | 11/1999 | Peifer et al. |
| 6,038,295 A | 3/2000 | Mattes |
| 6,061,088 A | 5/2000 | Khosravi et al. |
| 6,072,496 A | 6/2000 | Guenter et al. |
| 6,072,903 A | 6/2000 | Maki et al. |
| 6,122,005 A | 9/2000 | Sasaki et al. |
| 6,144,366 A | 11/2000 | Numazaki et al. |
| 6,150,810 A * | 11/2000 | Roybal ........................ 324/244 |
| 6,167,469 A | 12/2000 | Safai et al. |
| 6,204,877 B1 | 3/2001 | Kiyokawa |
| 6,208,376 B1 | 3/2001 | Tanaka et al. |
| 6,208,379 B1 | 3/2001 | Oya et al. |
| 6,239,836 B1 | 5/2001 | Suzuki et al. |
| 6,263,088 B1 | 7/2001 | Crabtree et al. |
| 6,271,752 B1 | 8/2001 | Vaios |
| 6,400,264 B1 | 6/2002 | Hsieh |
| 6,400,831 B2 | 6/2002 | Lee et al. |
| 6,414,716 B1 | 7/2002 | Kawai |
| 6,445,298 B1 | 9/2002 | Shepher |
| 6,469,737 B1 | 10/2002 | Igarashi et al. |
| 6,493,022 B1 | 12/2002 | Ho et al. |
| 6,525,761 B2 | 2/2003 | Sato et al. |
| 6,542,184 B1 | 4/2003 | Driscoll, Jr. et al. |
| 6,556,241 B1 | 4/2003 | Yoshimura et al. |
| 6,567,121 B1 | 5/2003 | Kuno |
| 6,567,122 B1 | 5/2003 | Anderson et al. |
| 6,567,502 B2 | 5/2003 | Zellner et al. |
| 6,577,337 B1 | 6/2003 | Kana |
| 6,583,815 B1 | 6/2003 | Driscoll, Jr. et al. |
| 6,587,046 B2 | 7/2003 | Joao |
| 6,611,285 B1 | 8/2003 | Morita |
| 6,636,259 B1 | 10/2003 | Anderson et al. |
| 6,642,959 B1 | 11/2003 | Arai |
| 6,670,984 B1 | 12/2003 | Tanaka et al. |
| 6,678,413 B1 | 1/2004 | Liang et al. |
| 6,680,746 B2 | 1/2004 | Kawai et al. |
| 6,690,411 B2 | 2/2004 | Naidoo et al. |
| 6,696,957 B2 | 2/2004 | Shepher |
| 6,698,021 B1 | 2/2004 | Amini et al. |
| 6,700,487 B2 | 3/2004 | Lyons et al. |
| 6,710,800 B1 | 3/2004 | Park |
| 6,714,236 B1 | 3/2004 | Wada et al. |
| 6,715,003 B1 | 3/2004 | Safai |
| 6,720,990 B1 | 4/2004 | Walker et al. |
| 6,727,811 B1 | 4/2004 | Fendis |
| 6,727,940 B1 | 4/2004 | Oka et al. |
| 6,732,191 B1 | 5/2004 | Baker et al. |
| 6,747,689 B1 | 6/2004 | Vo et al. |
| 6,748,052 B2 | 6/2004 | Zellner et al. |
| 6,750,902 B1 | 6/2004 | Steinberg et al. |
| 6,754,368 B1 | 6/2004 | Cohen |
| 6,754,369 B1 | 6/2004 | Sazawa |
| 6,771,741 B2 | 8/2004 | Kliland |
| 6,774,935 B1 | 8/2004 | Morimoto et al. |
| 6,778,705 B2 | 8/2004 | Gutta et al. |
| 6,784,924 B2 | 8/2004 | Ward et al. |
| 6,803,945 B1 | 10/2004 | Needham |
| 6,807,564 B1 | 10/2004 | Zellner et al. |
| 6,812,961 B1 | 11/2004 | Parwski et al. |
| 6,812,962 B1 | 11/2004 | Fredlund et al. |
| 6,813,312 B2 | 11/2004 | Tullberg et al. |
| 6,822,676 B1 | 11/2004 | Kurosawa et al. |
| 6,836,287 B1 | 12/2004 | Nakahara |
| 6,903,765 B1 | 6/2005 | Takagi et al. |
| 6,909,745 B1 | 6/2005 | Puri et al. |
| 6,927,686 B2 | 8/2005 | Nieters et al. |
| 6,930,598 B2 | 8/2005 | Weiss |
| 6,940,404 B2 | 9/2005 | Nagao et al. |
| 6,944,421 B2 | 9/2005 | Axelrod |
| 6,968,006 B1 | 11/2005 | Puri et al. |
| 6,970,102 B2 | 11/2005 | Ciolli |
| 6,970,513 B1 | 11/2005 | Puri et al. |
| 7,017,521 B2 | 11/2005 | Collins |
| RE38,908 E | 12/2005 | Ho et al. |
| RE38,967 E | 2/2006 | Kreuzer et al. |
| 7,092,009 B2 | 8/2006 | Patel |
| 7,113,092 B2 * | 9/2006 | Keene ........................ 340/551 |
| 7,199,820 B2 | 2/2007 | Oka |
| 2002/0140850 A1 * | 10/2002 | Toste et al. ................. 348/375 |
| 2002/0158970 A1 | 10/2002 | Ta Keshi |
| 2002/0171741 A1 | 11/2002 | Tankin et al. |
| 2002/0176624 A1 * | 11/2002 | Kostrzewski et al. ........ 382/173 |
| 2003/0043279 A1 | 3/2003 | Alardin |
| 2003/0103146 A1 | 6/2003 | Kim |
| 2003/0117500 A1 | 6/2003 | Lin |
| 2003/0122949 A1 | 7/2003 | Kanematsu et al. |
| 2003/0128130 A1 | 7/2003 | Kao |
| 2003/0135865 A1 | 7/2003 | Jung |
| 2003/0197789 A1 | 10/2003 | Coffland |
| 2004/0008263 A1 | 1/2004 | Sayers |
| 2004/0066457 A1 | 4/2004 | Silverstein et al. |
| 2004/0075547 A1 | 4/2004 | Vojtech et al. |
| 2004/0105019 A1 | 6/2004 | Imanishi et al. |
| 2004/0109063 A1 * | 6/2004 | Kusaka et al. ............ 348/207.1 |
| 2004/0125214 A1 | 7/2004 | Oka et al. |
| 2004/0125216 A1 | 7/2004 | Keskar et al. |
| 2004/0155963 A1 | 8/2004 | Kondo et al. |
| 2004/0161133 A1 * | 8/2004 | Elazar et al. ................ 382/115 |
| 2004/0169757 A1 | 9/2004 | Amachree |
| 2004/0169759 A1 | 9/2004 | Kikuchi |
| 2004/0174434 A1 | 9/2004 | Walker et al. |
| 2004/0189816 A1 | 9/2004 | Nakazawa et al. |
| 2004/0233282 A1 * | 11/2004 | Stavely et al. ............... 348/143 |
| 2004/0252193 A1 * | 12/2004 | Higgins ...................... 348/149 |
| 2004/0252201 A1 | 12/2004 | Meitav et al. |
| 2004/0263636 A1 | 12/2004 | Cutler et al. |
| 2004/0267440 A1 * | 12/2004 | DeKock et al. .............. 701/117 |
| 2005/0128295 A1 * | 6/2005 | Addy ........................ 348/153 |
| 2006/0017809 A1 | 1/2006 | Carroll |
| 2006/0136131 A1 * | 6/2006 | Dugan et al. ................ 701/300 |

OTHER PUBLICATIONS

Caruso, Michael J., Withanawasarn, Lucky S., *Vehicle Detection and Compass Applications Using AMR Magnetic Sensors*, pp. 1-13, Undated.

D-Link, Wireless Home Video Surveillance, DCS-900W, *Internet Camera*, pp. 1-2, Undated.

Honeywell, *Application Note-AN218 Vehicle Detection Using AMR Sensors*, pp. 1-10, Aug. 2005.

* cited by examiner

Baseline profile - no event

Ideal image frame selected

Boundary comparison made to Baseline Profile pixel range

FIG. 7

REMOTE VIDEO MONITORING OF NON-URBAN OUTDOOR SITES

REFERENCE TO RELATED APPLICATIONS

This application claims the benefit of U.S. Provisional Application No. 60/662,205, filed Mar. 16, 2005 and which is incorporated by reference herein in its entirety.

FIELD OF THE INVENTION

This invention generally relates to remote video monitoring and, more particularly, to monitoring of remote outdoor locations (such as trails, boat landings, borders) for detection and video capture of potentially unauthorized activities, and transmission of captured video sequences to a remote monitoring center for storage and analysis.

BACKGROUND OF THE INVENTION

Monitoring of activity to ensure laws are abided by, such as protecting private property from trespassers or policing proper use of natural resources, at remote sites can be manpower-intensive. Having an enforcement officer present at the appropriate time and place to prevent, recognize, and cite an infraction is unlikely for many reasons. For example, to place a conservation officer or security guard at an access point to monitor lawful access to land and appropriate usage of resources would require at least $120,000 per year per location, and local governments and private organizations or landowners simply do not have the financial and other necessary resources to staff their remote sites around-the-clock. Also, it is generally understood that lawfulness of conduct is greatly affected by the presence or absence of an enforcement officer. Thus, in the usual instance when an enforcement officer is absent, unlawful activity is much more likely to take place and go un-checked. The use of volunteers or interns in lieu of enforcement officers is often ineffective as a deterrent to unlawful activity as the volunteers and interns lack the authority to issue citations to infractions.

In order to capture usage activities occurring in remote locations and notify authorized personnel for enforcement actions against improper use, an unmanned, low maintenance system for capturing activities when they occur is desirable. Capturing video images may provide the added benefit of evidence if there is to be enforcement sought such as criminal prosecution or civil remedies. Video camera technology for safety and security monitoring is well-known and widely deployed. Common applications include protecting premises, personal safety, traffic management and rule enforcement. For example, typical traffic monitoring systems are directed to identifying congestion, speeding or red-light running instances. These systems utilize outdoor cameras to remotely capture still image or continuous video sequences, which are subsequently analyzed at special monitoring centers manned 24 hours a day by dedicated personnel. Certain applications are known in which multiple cameras are deployed that are automatically monitored by locally-housed computer systems that can select specific video sequences for transfer to a centralized monitoring center.

Conventional video monitoring systems generally enjoy the advantages of having an AC mains power supply and communications connectivity that can enable the user to select full-function video camera features and functionality (e.g. pan, tilt, zoom, high-definition CCD image sensing, or locally-housed image storage). Typically, mounting locations for video monitoring cameras are selected to be physically inaccessible to the public (such as at elevated points) or at places where pedestrian access is prohibited (such as at parking ramp exists). The general area of deployment tends to be around population centers where there is existing mounting structures, abundant electrical power, and communications infrastructure. These types of technologies are not well-suited to monitoring remote locations, such as in rural outdoor sites in which electrical power and communications infrastructure is not present or readily accessible.

For instance, conventional video cameras have significant power requirements such that mains power is necessary at the camera locations. Moreover, conventional network-accessible cameras require a readily available broadband networking capability to communicate. For remote deployment, providing power and communications infrastructure is impracticable. Conventional solutions for protecting the remote-mounted cameras from vandalism, such as mounting the cameras 18 feet or more above the ground is costly without the ability to use existing structures and wiring. Deploying these systems at or near ground level (for example, such that the camera is between 1 and 5 feet from an elevation of a road or trail) or in remote locations to capture infractions only viewable near the ground would quickly render damage to these systems by those individuals whose activity is to be captured at a location where there are no other personnel in the vicinity. Also, conventional camera housings are typically not hardened to the area of deployment. A person with malicious intent could fairly easily dispatch a conventional camera with a shot from a rifle.

The use of hidden or unobtrusively-placed video cameras limits the camera's ability to capture critical identifying information about the subject being monitored, such as a license plate number or boat registration ID. Moreover, hidden cameras do not provide a deterrent effect for unlawful behavior, which is desirable in some cases.

Remote location video monitoring systems presently exist that selectively capture still images or video sequences in response to a certain sensed event. One type of event-triggered system is the intersection infraction camera systems deployed in many cities. The intersection infraction (i.e. red light running) cameras can utilize various sensing mechanisms to detect the presence of a vehicle in an intersection. One type of well-known sensing technology is an induction-type sensor in which a magnetic field is generated by under-street magnetic radiating antenna stimulating signal generator coupled thereto. When a vehicle passes through the radiated magnetic field, the voltage induced in the loop by the magnetic field changes, and this change is detected by sensing circuitry. Another type of sensing technology involves the use of radar or laser instruments such as those used for measuring the speed of vehicles. Other mechanisms for detecting an intersection infraction involves taking continuous video and analyzing the images in the video to detect the presence of a vehicle at certain times. All of these types of sensing technologies involve emitting relatively high-energy signals or operating the monitoring system continuously for video capture and processing. As described above, due to the lack of power infrastructure, these triggering technologies are not suited for remote non-urban outdoor site monitoring.

Infra-red (IR) motion detectors for use in triggering remote video monitoring cameras are known. These types of motion detectors are generally low-power and respond to detected movement of people and animals in addition to the movement of certain vehicles. However, IR motion detectors cannot specifically distinguish vehicles from animals. Therefore, IR motion detectors are not well suited for detecting activities involving vehicles while ignoring other types of activities. IR motion detectors also require a visual line-of-sight to the monitored site. This requirement adds significant design and cost constraints. It is also quite difficult to use IR sensors and protect them from environmental and vandalism damages.

To date, a practical solution for remote video monitoring of non-urban outdoor sites for specific activities has not been proposed. In view of the limitations of existing video monitoring technologies described above, as well as other related limitations, the existing remote video monitoring technologies are not readily adaptable to such applications.

SUMMARY OF THE INVENTION

Aspects of the invention are directed to systems deployable to one or more remote locations to detect and monitor certain events or conditions, capture video of activities of interest, and transmit captured video over a computer network such as the Internet, for example, to an off-site database that stores and organizes captured videos. Preferably, captured videos are associated with the corresponding locations where the videos were captured. To reduce the manpower needed to review and analyze the events captured on video, the system can optionally perform video image analysis to identify vehicles, certain activities, and rule infractions. The videos and related data can be made available to authorized individuals for retrieval and reviewing over a computer network.

A video monitoring unit (VMU) comprises a digital video camera, an activity sensor, a circuit programmed to provide power to the camera to initiate its video capturing for a preset period of time, and an antenna to wirelessly communicate this to a Wireless Access Point for storage on a server. In one embodiment supporting the power demands for this method are solar panel(s), rechargeable batteries, and a solar controller to ensure efficient battery charging and utilization.

In one embodiment, the VMU communicates with a remote server through a wireless access point that has been established within wireless communications range. Preferably, a camera with built-in web server is configured to communicate either encrypted or unencrypted data and transfer video sequences associated with the VMU's unique identifier to the remote server. The remote server assigns a device/date/timestamp to the video sequence and stores it in the appropriate directory on the server. Additional software is used to review the image information and store its metadata in a database. The meta data comprises any of: a location identifier, map coordinates, date, time, duration of video, identified license plate, positive infraction indicator. License plate identification software is used to convert a frame of video showing the license to an actual character sequence that can be searched on. Image recognition software is utilized to identify the potential presence of invasive species on the boat trailer or identify a registration sticker that is not current.

Preferably, a remote user can gain access to the website through any Internet connected computer system with a standard browser. The user is authenticated for their particular section of the database for which they are allowed to view activities. The user is then provided with a Geographical Information System map (such as the MAP Server standard) which is overlayed with the clickable locations as to where the local surveillance units are located. By clicking on one of these remote locations, the user is presented with a view of recent transactions collected by that unit upon which they can click to pull up a video playback screen. They have the additional capability of querying the database based on date ranges, license plate numbers, or potential infraction indicators to retrieve a more refined list of videos to review. Any video playback can be paused and a snapshot taken for inclusion in a communication or potential citation issuance.

To facilitate maintenance or management of the remote environment, the browser and application software of the remote computer system may communicate with the VMU via the Internet or any other communications network.

A method of remotely detecting rule violations at an outdoor site according to one aspect of the invention includes installing a self-contained VMU at the outdoor site near ground elevation, including affixing a chassis of the VMU to a permanent mount. The VMU is operated in a low-power standby mode that includes passively monitoring an ambient magnetic field at the outdoor site to detect a disturbance caused by a presence of a substantial ferrous object. In response to a detection of a disturbance in the ambient magnetic field, the VMU exits the low-power standby mode and initiates an active operating mode. The active operating mode includes operating a video camera by the VMU to capture video data; and wirelessly transmitting a signal representing at least a portion of the video data to a computer network. The video data is received by a remote node in the computer network via the computer network, and stored in association with a database record.

A system for automatically monitoring a plurality of outdoor sites according to another aspect of the invention includes a plurality of VMUs, each VMU installed at a corresponding one of the plurality of outdoor sites, and each VMU comprising: a ruggedized housing fixed to a non-movable base, a video capture circuit, a first event sensor circuit, a radio transmitter circuit, and a controller circuit electrically coupled with each of the other circuits. The controller circuit executes instructions that cause the VMU to operate in a standby mode and in a video capture mode. In the standby mode, the first event sensor monitors a portion of the corresponding outdoor site for an occurrence of at least one triggering event. In response to a detection of a first triggering event, the VMU enters into the video capture mode in which the video capture circuit captures a video sequence of the corresponding outdoor site, and the radio transmitter circuit transmits at least a portion of the video sequence to a receiver interfaced with a computer network. A monitoring center communicatively coupled with the computer network receives the at least portion of the video sequence via the computer network and manages a database having items corresponding to video-captured events at any of the plurality of outdoor sites. The received video is stored as an item associated with the database, and access to the database items is provided via the computer network.

Optionally, the system includes a video processing application at the monitoring center that analyzes the at least portion of the video sequence to detect a presence of at least one of a set of predefined video image patterns, such as, for example, motor vehicle usage; transportation of aquatic vegetation; a presence of an item dangling from a motor vehicle, watercraft, or trailer; a presence of a license plate; and a presence of a registration label.

According to another aspect of the invention, a method of operating a video monitoring center for monitoring events occurring at any of a plurality of remote outdoor sites, each outdoor site corresponding to at least one site owner/operator is disclosed. The method includes the steps of: installing a plurality of self-contained video monitoring units (VMUs) at a plurality of outdoor sites such that at least one of the VMUs is positioned near ground elevation; wirelessly networking each of the VMUs to a video monitoring center; initiating a first video transmission from a first VMU at a first outdoor site in response to an automatic detection of a triggering event by the first VMU; in response to receiving the first video transmission by the video monitoring center, storing a first video clip from the first video transmission in a database record together with location and time information relating to the first outdoor site and a time associated with the first video transmission; maintaining a user access account for selectively providing an authorized user with access to the database record via the Internet; and automatically operating a graphical user interface that permits the authorized user to interactively view information related to the database record, including selectively viewing at least a portion of the first video clip.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
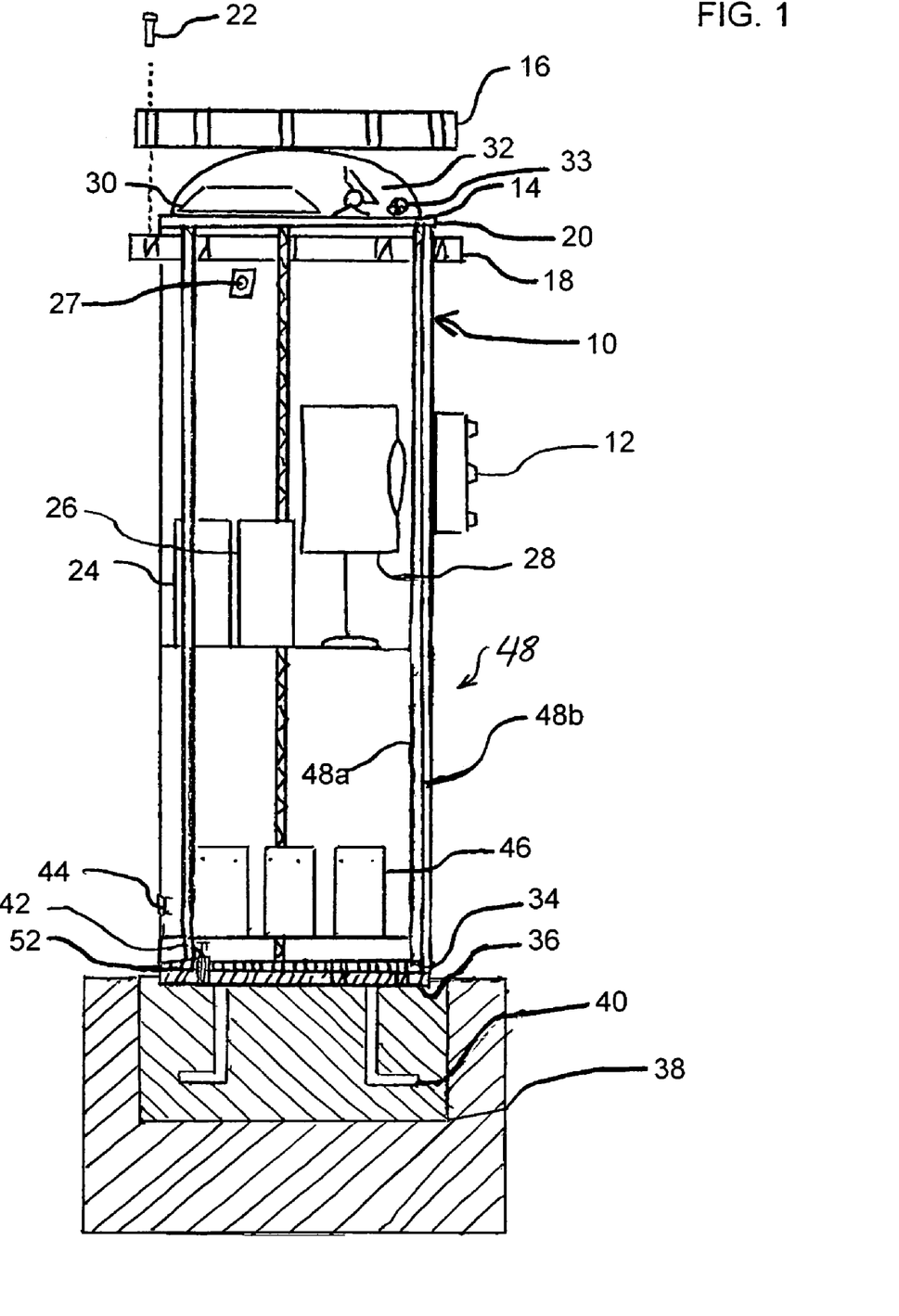
FIG. 1 is a cross-sectional view diagram depicting an example of a self-contained video monitoring unit (VMU) according to one aspect of the invention.

Referring now more particularly to the drawings, and to the preferred embodiment of the invention here presented by way of illustration, FIG. 1 illustrates a video monitoring unit (VMU) housing 10 (which in one embodiment could be ⅜" schedule 40 stainless steel) that is mounted to a concrete footing 38 which is no less than 28" deep by no less than 18" in diameter. The concrete footing 38 has been poured with four or more of steel rebar supports 40 extending from the underside of a footing plate 36. Enabling housing 10 to be mounted to the Concrete footing 38 is a housing base 34. The housing base 34 is permanently affixed to the housing 10 and contains 16 or more holes to accommodate a series of mounting bolts 42. Footing gasket 52 creates an air and waterproof seal to the footing.

The interior of housing 10 includes a chassis on which are mounted various components and electronic systems. In one embodiment, the chassis comprises sleeve 48 that includes 3 platforms 48a held together by 3 sleeve columns 48b between each of the three levels. The sleeve 48 holds various components and can be easily removed from housing 10 for servicing. Mounted at the lowermost level is one or more batteries 46. In one embodiment each of the batteries 46 is a rechargeable 12 v, 6 amp type and may include one cell or multiple cells connected in series or in parallel. The battery technology can be lead-acid, lithium ion, or any suitable type known in the art. Mounted at the intermediate level are solar controller 24, circuit 26, and video camera 28. The top level includes solar panel 30, antenna 32 and sleeve handles 33.

The top of housing 10 has a base ring 18 permanently affixed thereto with threads to accommodate closing bolts 22. The roof of housing 10 is completed by installing a hemispherical-shaped dome 14 which, in one embodiment, is formed from clear UV-resistant polycarbonate material. To deflect ballistic attempts to defeat the hardened device, dome 14 is preferably cast with a ½-inch thickness and an internal radius of between 3.5 inches and 4.5 inches. Dome 14 has a flange around its entire circumference which allows it to be secured. A donut-shaped Dome Gasket 20 just covers the top surface in between the Dome 14 and housing 10. A Sealing Ring 16 is finally placed on top and fastened with Closing Bolts 22 to create a watertight seal securing the Dome 14. By utilizing a dome on the Video Monitoring Unit, the antenna 32 in a preferred embodiment has receptivity of 6 dbi or greater (e.g. a Hawking 2.4 Ghz HIGain antenna), provides a low profile form factor that can be rotated to aim at the Wireless Access Point independent of how the VMU is mounted to the footing, and is connected to the Video Camera 28, via an extension cable. By incorporating this antenna with a Polycarbonate dome of this radius, a transmission distance of over 1 mile can be attained without the use of repeaters. A Pressure Valve 44 on the exterior allows the entire secured housing 10 to be either placed under pressure, filled with nitrogen, potting material or silica gel packs to eliminate condensation of enclosed electrical and optical components.

Figure 2:
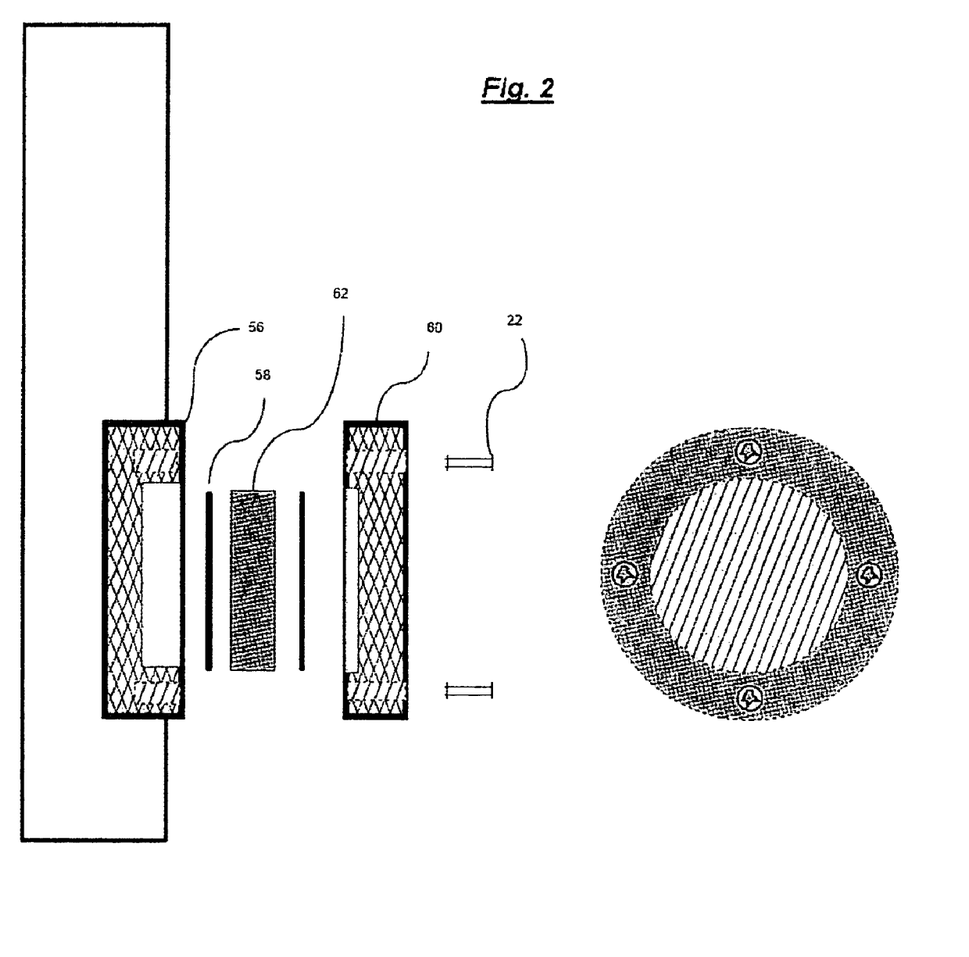
FIG. 2 is a cross-sectional view diagram illustrating an example of a video camera monitoring portal for the VMU of FIG. 1.

In FIG. 2 a portal 12 for use with housing 10 is depicted in cross-sectional view. Portal 12 comprises portal base 56 containing four threaded holes to accommodate closing bolts 22. A portal ring 60 secures two lens gaskets 58 between which is positioned lens 62. In one embodiment lens 62 is comprised of ½-inch thick level 3 ballistic tested clear materials such as polycarbonate sandwiched between levels of glass.

Referring again to FIG. 1, in one embodiment, solar panel 30 is electrically interconnected with solar controller 24. Solar controller 24 has connections to the batteries 46 as well as to circuit 26. Solar controller 24 regulates the amount of electricity transmitted to the batteries 46 to prevent overcharging and ensures that there is enough power to circuit 26. Circuit 26 includes a circuit card assembly with suitable electrical interconnections between electrical/electronic components. Preferably, circuit 26 is positioned in the center of housing 10 both vertically and horizontally. As described in greater detail below, the horizontal and vertical symmetry facilitates the use of a passive magnetic sensor 86 with characteristics of being able to operate properly through the stainless steel housing 10 with sufficient sensitivity to detect measurable changes to the ambient magnetic field. In one embodiment, power to the sensor 86 is enabled through an external Key Switch 27 which can only be turned with a special tool.

Solar controller 24 has a power cord connected to the Video Camera 28 providing proper voltage for the device. Antenna 32 has a cable for connection to video camera 28. Video camera 28 in one embodiment is a combination device comprising a digital video image sensor, an image processor, a video data buffer, and wireless network interface circuit with a unique MAC address. Such devices are known in the art, such as, for example Dlink model D900w, which runs software on-board that enables the device to transmit a stream of captured video images over a computer network, and preferably transmits packets of data representing a video stream wirelessly. The unique MAC address is included in the video data transmission, and enables the receiver of the transmitted stream of captured video to identify the specific video capture device that is the origin of the transmission. In this regard, the MAC address is part of a set of metadata that is transmitted together with the video data. Optionally, the set of metadata can include other information, such as, for example, timestamp/datestamp information, duration of video information, information about the operating parameters of performance of at least one VMU system, and the like.

Figure 3A:
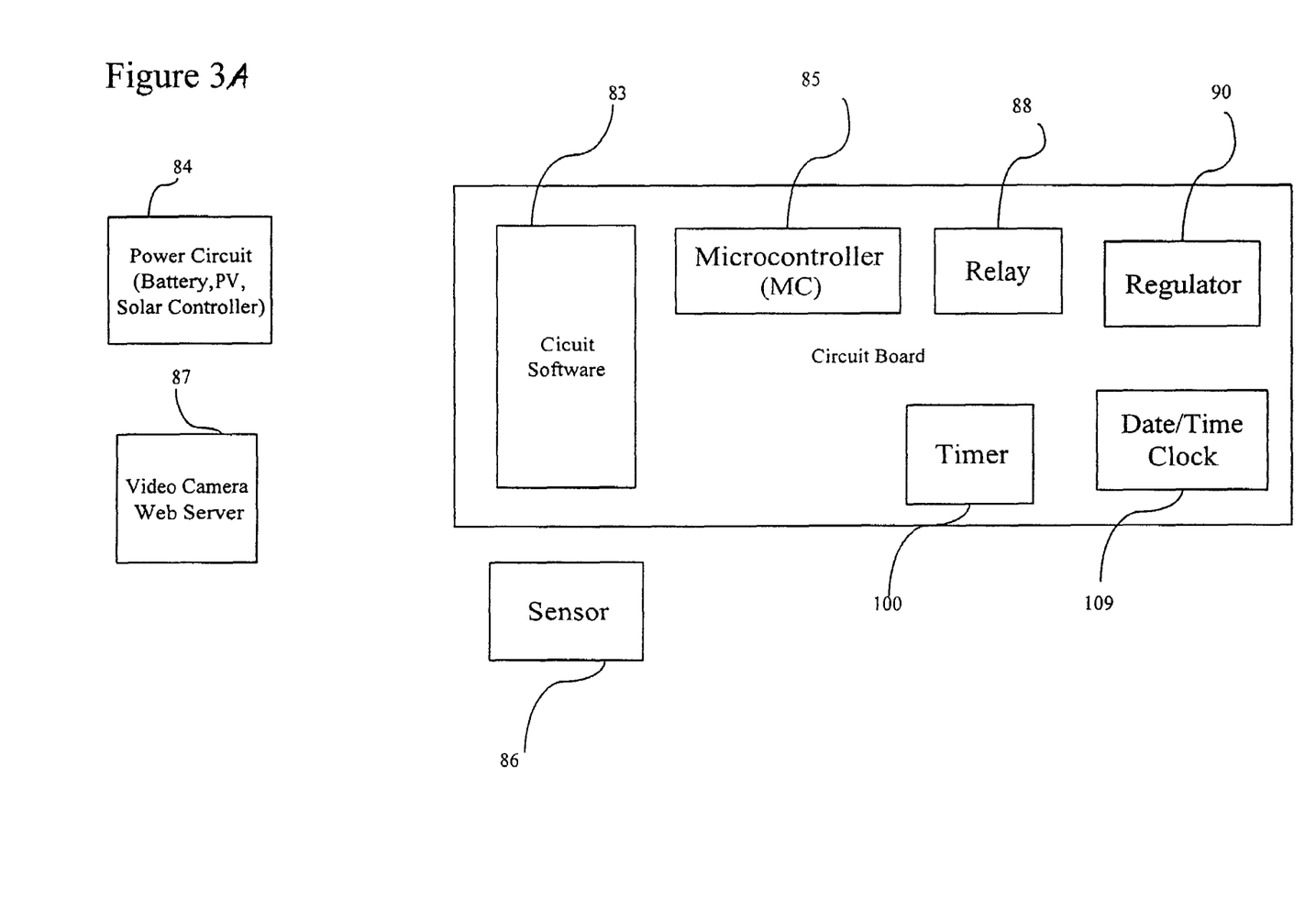
FIG. 3A is a block diagram illustrating some of the subsystems of the example VMU of FIG. 1 that are related to overall VMU control.

FIG. 3A illustrates some of the sub-systems of an example VMU that are related to overall VMU control. The circuit board comprises several key components including but not limited to: a microcontroller 85 running a program that causes circuit 26 to perform its various functions; a high efficiency power regulator 90; an event sensor 86; a power relay 88; a configurable timer circuit 100; and a date/time clock 109. Sensor 86 can utilize any suitable event sensing technology including, but not limited to: an infra red (IR) motion sensor, a magnetic field sensor, an audible sound transducer such as a microphone, a mechanical vibration sensor such as an accelerometer, a radio frequency identification (RFID) reader, a light level sensor such as a photovoltaic cell, and the like. In one type of embodiment, multiple sensors are utilized as event sensor 86. In related embodiments, the multiple sensors of event sensor 86 can be of the same type, or of different types of sensing technologies for detecting different types of events or different indicia of the same event.

In one embodiment that is preferred in some applications for detecting the presence of vehicles, a passive magnetic sensor is used as sensor 86 positioned inside of housing 10 of the VMU. Passive magnetic sensors are generally known in the art. One type of passive magnetic sensing technology is referred to as anisotropic magnetoresistive (AMR) sensing, such as the technology described in Michael J. Caruso, Lucky S. Withanawasam, *Vehicle Detection and Compass Applications using AMR Magnetic Sensors*; and Application Note AN218: Vehicle Detection Using AMR Sensors; both published by Honeywell Inc., and which are incorporated by reference herein in their entirety. The passive magnetic sensor detects a disturbance in the ambient magnetic field that is caused by the presence of a substantial ferrous object (e.g. a vehicle or trailer), moving within a relatively close proximity (such as 20 feet, for example) of the sensor. The sensor converts magnetic fields to differential output voltages and measuring circuitry detects changes in the output voltages. The sensor provides an output signal that is indicative of the measured changes.

This type of sensing technology is passive in the sense that the ambient magnetic field can be the Earth's magnetic field, thereby obviating the having to generate a local magnetic field with a driving signal stimulus and field radiating element. A related embodiment can deploy the magnetic sensor (or any type of event sensor 86) remotely from the VMU at some physical distance where it could communicate an event detection via a radio frequency or some other suitable wireless communication method to microcontroller 85. In one embodiment, a VMU includes both, at least one sensor enclosed inside housing 10, and at least one remote sensor communicatively coupled with the VMU.

One example of a single axis passive magnetic sensor is Honeywell model HMC1051. This sensor can be interfaced with microcontroller 85. This type of sensor output has a tendency to drift over time, temperature, and exposure to relatively high-amplitude magnetic fields. Therefore, preferably, microcontroller 85 is configured to set and reset the sensor to clear any measurement drift or offset thereby restoring sensitivity. In experimentation, performing a 0.5 A set/reset for only a millisecond at 60 second intervals provides significant power savings and retains sensitivity and field range. In this embodiment microcontroller 85 determines when a sensor output varies by an amount that corresponds to a magnetic field variation of >4 mGauss and considers this a detected event.

Installing the passive magnetic sensor into a largely ferrous housing, such as a steel housing, is discouraged by the manufacturer and by the accepted practices in the art based on the common understanding that the magnetic shielding effect would render the sensor useless. However, empirical results suggest that an AMR sensor can be effective when installed in a Schedule 40 brushed stainless steel housing when the sensor is positioned at the core of the internal sleeve of the VMU. More precisely, by mounting the sensor at the center of the cylindrical housing, a reduced yet detectable measurement of magnetic field disturbance can be detected with an acceptable level of performance.

Figure 3B:
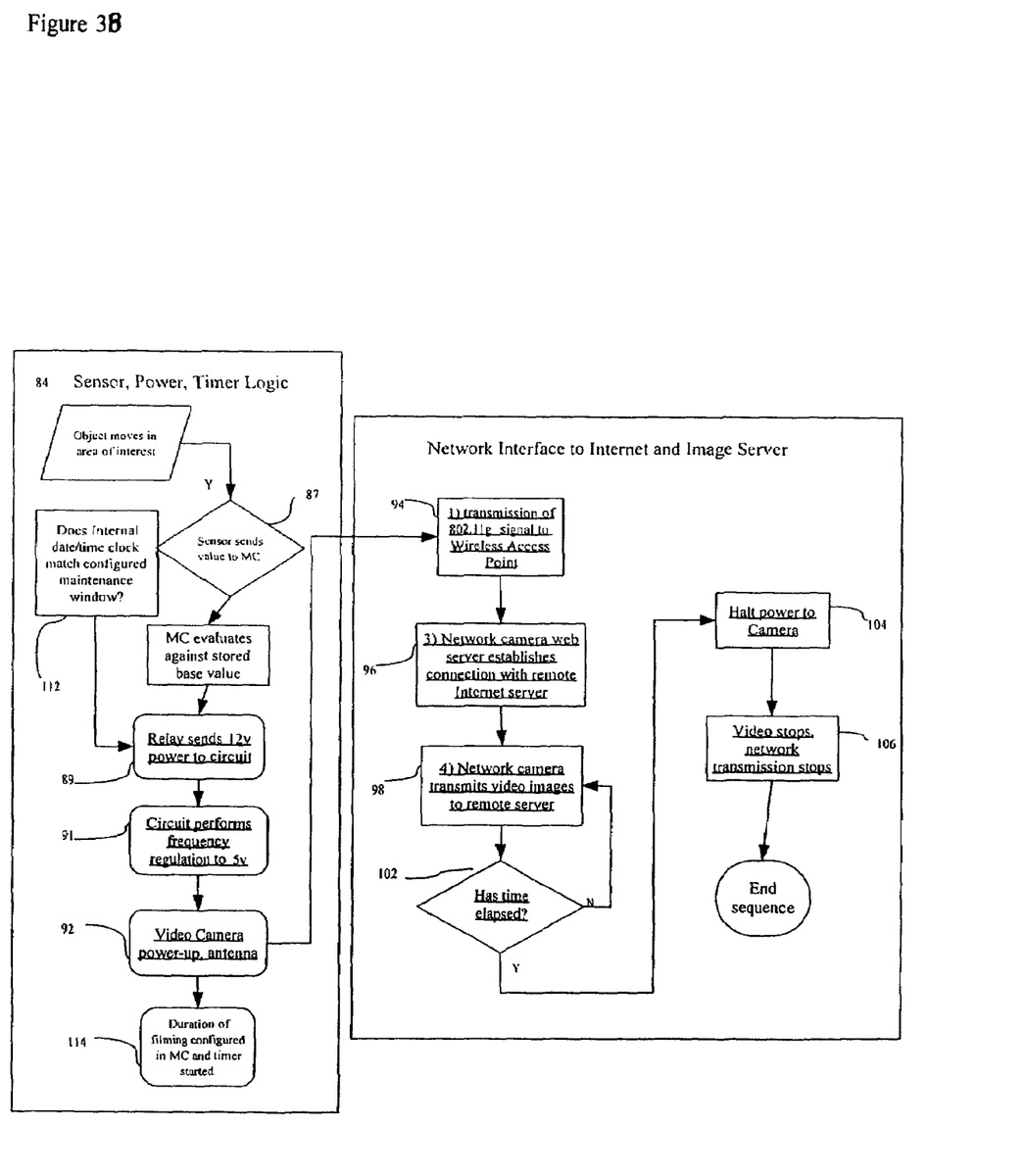
FIG. 3B is a flow diagram illustrating an example operating sequence for intermittent video monitoring by the example VMU of FIG. 1.

FIG. 3B is a flow diagram illustrating an example operating sequence for intermittent video monitoring. As indicated at steps 87, 88, 89, 91, and 92, if measurement from sensor 86 exceeds a stored nominal value by a significant amount, microcontroller 85 causes relay 88 to send 12 v power to regulator 90, which, in turn, converts and delivers power to video camera 26. Microcontroller 85 also configures timer 100 with a predetermined amount of time, and initiates running of timer 100, as indicated at step 114.

Figure 4:
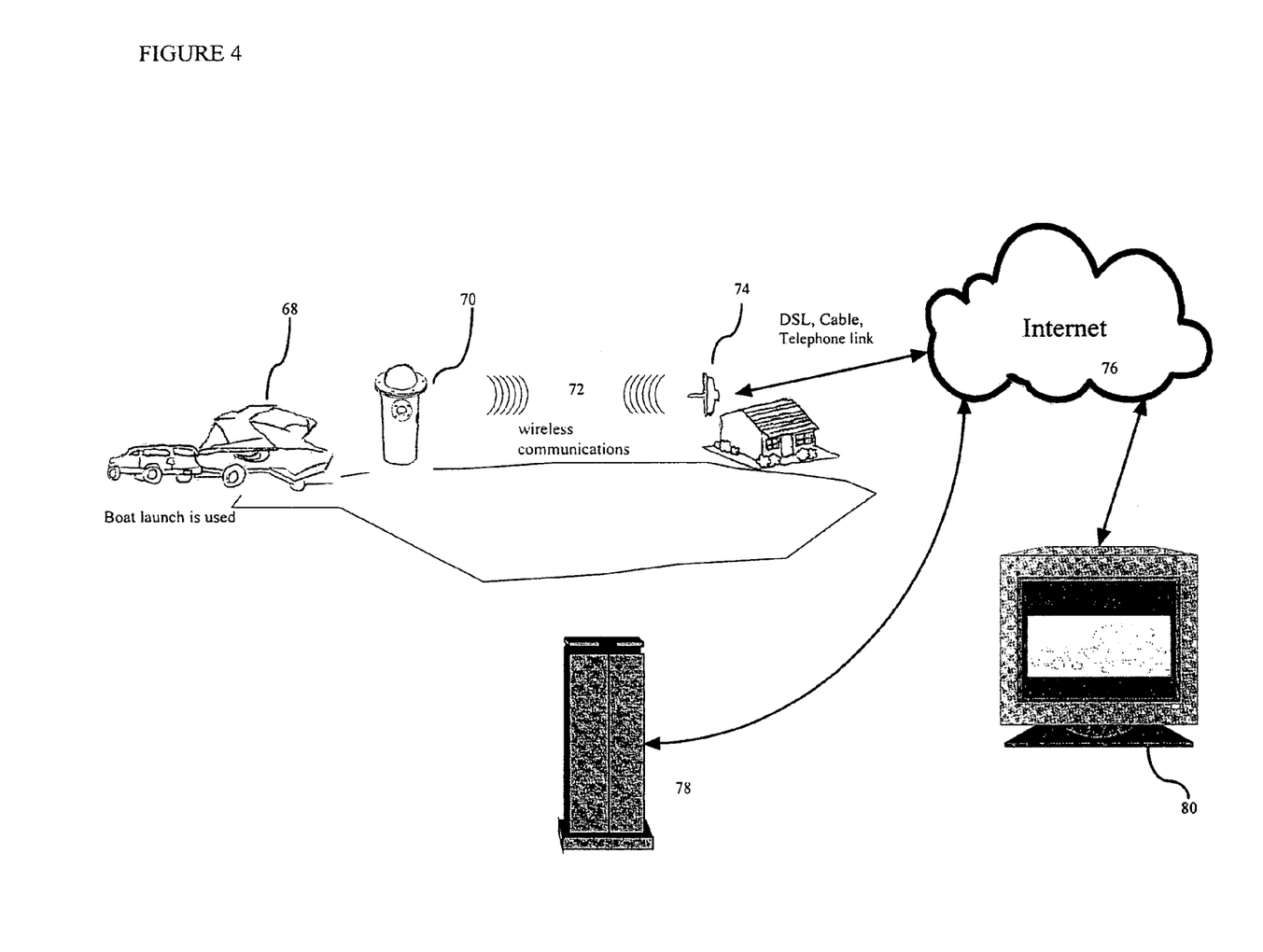
FIG. 4 is a diagram illustrating an example system arrangement in which a VMU monitors an outdoor site and wirelessly transmits video information to a monitoring center over the Internet.

In a preferred embodiment, video camera 26 runs web server software which has been configured to establish either secure or open communication with a wireless access point. Data representing the video image sequences captured by video camera 28 is transmitted to monitoring center 78 (FIG. 4). In one embodiment, monitoring center 78 includes one computer or a plurality networked computers and interfaced peripherals, including one or more servers, either in a single location or distributed geographically, that execute software for maintaining video and related information, for processing video images, and for providing user access to the maintained and/or processed video and related information. Thus, monitoring center 78 need not be limited to a centralized concentration of hardware. In one embodiment, monitoring center 78 can be a central point of access to collected video and related data.

As indicated at step 94 the data communication begins with establishment of a wireless network connection between the VMU and a node on the Internet 76, such as wireless access point 74, via an IEEE 802.11g-type wireless link. Over the wireless link, video camera 26 (or a set of separate camera/network interface devices) establish connection with monitoring center 78 over the Internet 76, as indicated at step 96. Once this connection has been established, at step 98, the VMU transmits the video data and related information to monitoring center 78.

The video images are ultimately stored in a database managed by monitoring center 78. In another embodiment, The database can be managed at another location that is networked with monitoring center 78. Persons skilled in the art will recognize that the database can be a centralized or distributed model.

Preferably, at installations where wireless broadband communications are possible, the video images are transmitted in real-time or near-real-time over the Internet very shortly (<1 second) after they are acquired. This obviates the need for caching or buffering large amounts of video data. In one embodiment in which broadband Internet service is unavailable, wireless access point 74 stores the video image sequence on a local computer (not shown) and transmits multiple files via a packet switched telephone network (PSTN) at night over a dial-up connection to monitoring center 78. Another embodiment may have the video camera 26 interface with a local storage mechanism within the VMU, where images can be stored on a simple storage device such as an Apple IPOD. The images could be retrieved through an authorized person plugging in their mobile IPOD device through an interface port in housing 10 of the VMU. In another embodiment, a video enabled telephone (such as, for example, a 3G cellular phone) interfaced with video camera 28 utilizes its telecommunications infrastructure to transmit video to monitoring center 78 for storage and analysis.

Preferably, microcontroller 84 determines whether another significant event has been sensed while timer 100 is running. If so, microcontroller 84 causes timer 100 to reset and start counting down again while the video capture and transmission is taking place. When timer 100 has elapsed (step 102), microcontroller 84 responds by causing supply power to video camera 28 to be switched off at step 104. The effect of stopping power to video camera 28 causes the network transmission to stop at step 106. In response, monitoring center 78 completes reception of the video data, and makes the video data for other analysis steps that the monitoring center 78 can optionally perform.

Following video capture and transmission. The date/time clock 109 is queried by microcontroller 85 and, at a preset time, turns on power to the video camera 28 for an administrative maintenance window to validate operational performance and to configure any adjustments remotely to the communications parameters or viewing characteristics of camera 28.

During periods of no events, while video camera 28 is not using power, the solar panel 30 continues to make power available to the solar controller 24 and the event sensor 86 is operating in a monitoring mode to detect an occurrence of one or more events. In one embodiment, if solar controller 24 determines that batteries 46 do not have sufficient power, it will stop providing power to all circuits. All of this logic is adaptable in microcontroller 85 by reprogramming the software and re-loading it into the microcontroller's nonvolatile memory space.

Figure 5:
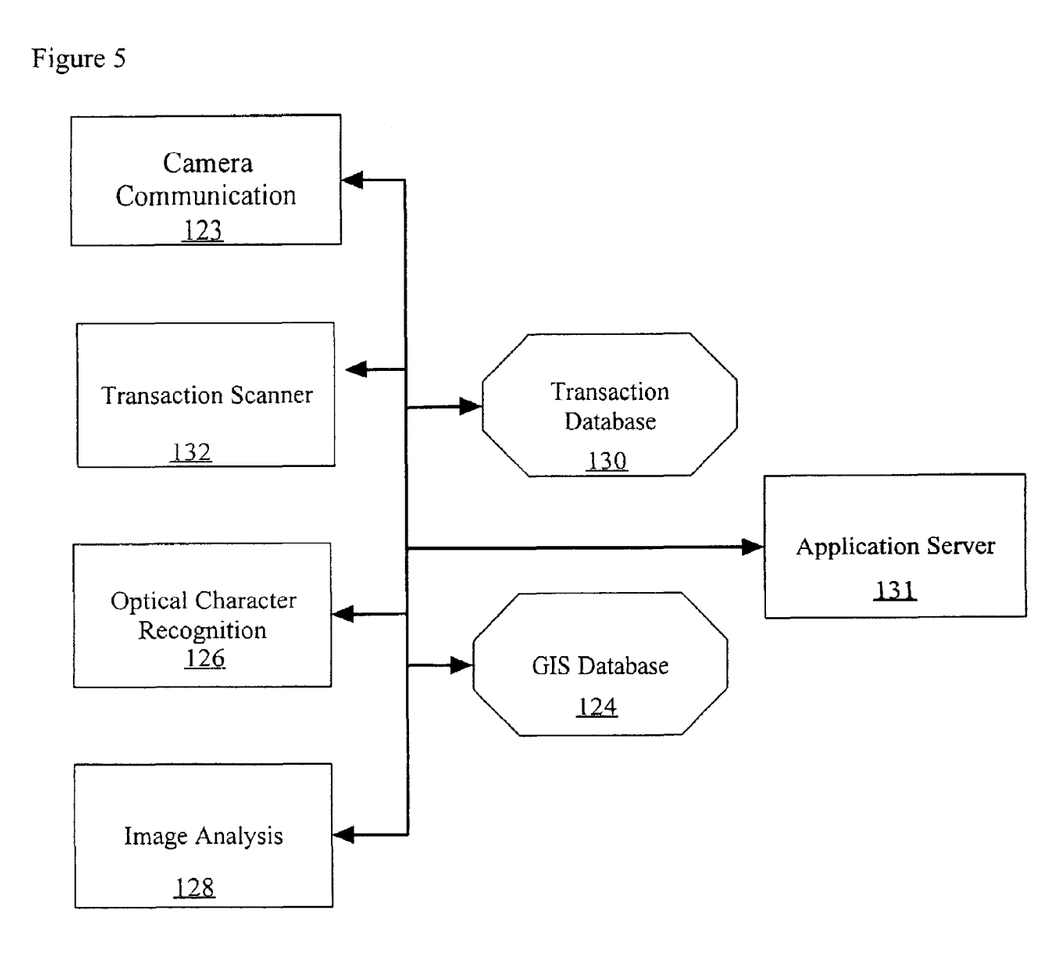
FIG. 5 is a block diagram illustrating an example set of software modules at a monitoring center according to one embodiment.

FIG. 5 is a diagram illustrating various exemplary software modules of the monitoring center 78 according to one type of embodiment. Monitoring center 78 registers the unique physical address with camera communication software 123 enabling remote administration and video transmission to the monitoring center. One example of developed software for this application is IPViewLite from DLink. However, off-the-shelf software such as this does not provide the ability to manage large numbers of cameras, each with a unique identifier, associate geographic coordinates of deployment, contact information for local management, status of transactions recorded, date of last transmission, and the like. To provide this functionality, a GIS database 124 is configured to interface with the camera communication module 123, and other software components to manage this data.

The GIS Database enables a plurality of video cameras to be managed, administered, and associates transaction video information with GIS coordinates for mapping. Upon termination of camera transmission, the camera communication module 123 writes the file to a specified folder. At this point, a transaction scanner application 130 indicates that a new video transaction has been recorded to the folder, assigns a unique character string (e.g., camera-id, date/time, etc.) to differentiate this video file from others in the database, and stores the video and related data in the transaction database 130 along with geographic coordinates from the GIS database. The unique geographic coordinates of the location of the video camera are derived from looking up the unique identifier of the camera as an index to the GIS database 124.

An optical character recognition program 126 scans all new video sequences to determine if a license plate character string could be derived from the video footage. If so, it adds the license plate information to the database entry for the video transaction in transaction database 130.

In one embodiment, an Image Analysis application 128 is invoked that automatically analyzes video data to look for predefined objects of interest that the system recognizes as a set of predefined video image patterns. The set of predefined image patterns can be associated with rule violations or other activities of interest. For example, the predefined image patterns can include motor vehicle usage, transportation of aquatic vegetation, a presence of an item dangling from a motor vehicle, watercraft, or trailer, or a presence of a license plate.

Figure 6:
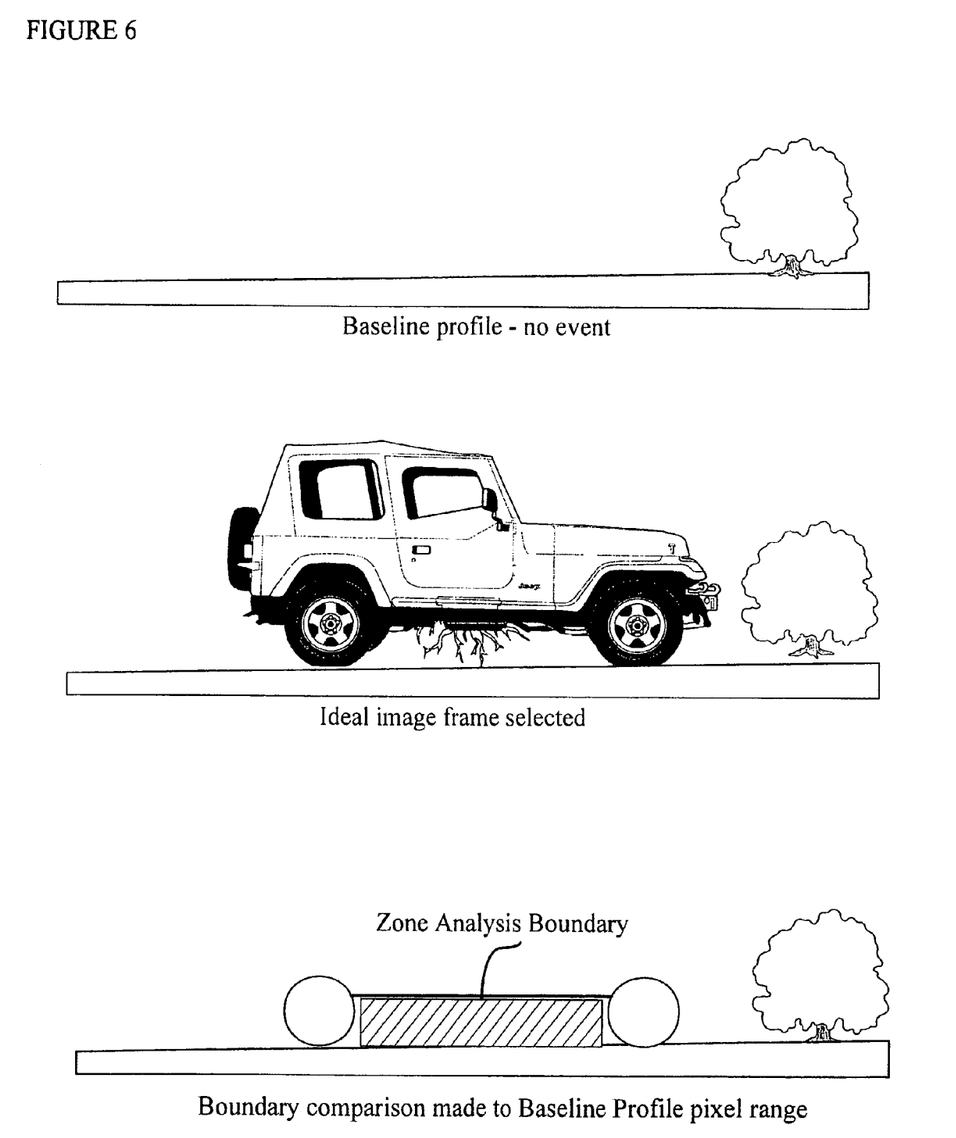
FIG. 6 illustrates one exemplary method of analyzing a video image for detecting an event of interest such as the presence of a certain type of object.

Referring now to FIG. 6, the objects of interest in this example are dangling aquatic vegetation from a vehicle chassis or boat trailer. Another activity of interest could be identified presence of a stream of water, suggesting that someone is engaged in draining of live wells. Due to the fact that these types of areas of interest are just above ground level and underneath a vehicle or trailer, a light pole or other mounting location that is positioned high off of the ground would not be able to discern the objects or activities of interest. Further, an elevated vantage point does not readily capture registration stickers on the side of vehicles or license plate clearly.

FIG. 6 illustrates an example of how the image analysis module 128 can operate. An example algorithm starts with the base image view of the area of interest as normal, selects one or several video frames of greatest interest (for instance, where the license plate was able to be obtained by the OCR software or where the position of the wheels is within the frame), evaluates that frame for a horizontal line between two wheels, either in a side view or a back view, and then contrasts the area below the horizontal line with the normal view for that area without the vehicle present. If there are vertical obstructions of 1-10 pixel width, for example, the software identifies that activity as being suspicious and highlights its entry in the Transaction Database with a review flag. Persons of ordinary skill in the image recognition software arts will understand this, as well as other suitable methodology for analyzing video images for certain predefined patterns. In a related embodiment, fuzzy algorithms can be utilized that assess probabilistically whether certain events of interest (including the presence of objects of interest) are more likely or less likely to be depicted in the video images analyzed. A score can be assigned to each video clip and the video clips can be selectively organized based on probability of occurrence of a certain event of interest (such as an infraction of a rule). Once Image Analysis and OCR scanning are complete, a flag is set in the Transaction Database to indicate the images have been automatically analyzed. In a related embodiment, an event occurrence probability or score is included as part of the flag.

Figure 7:
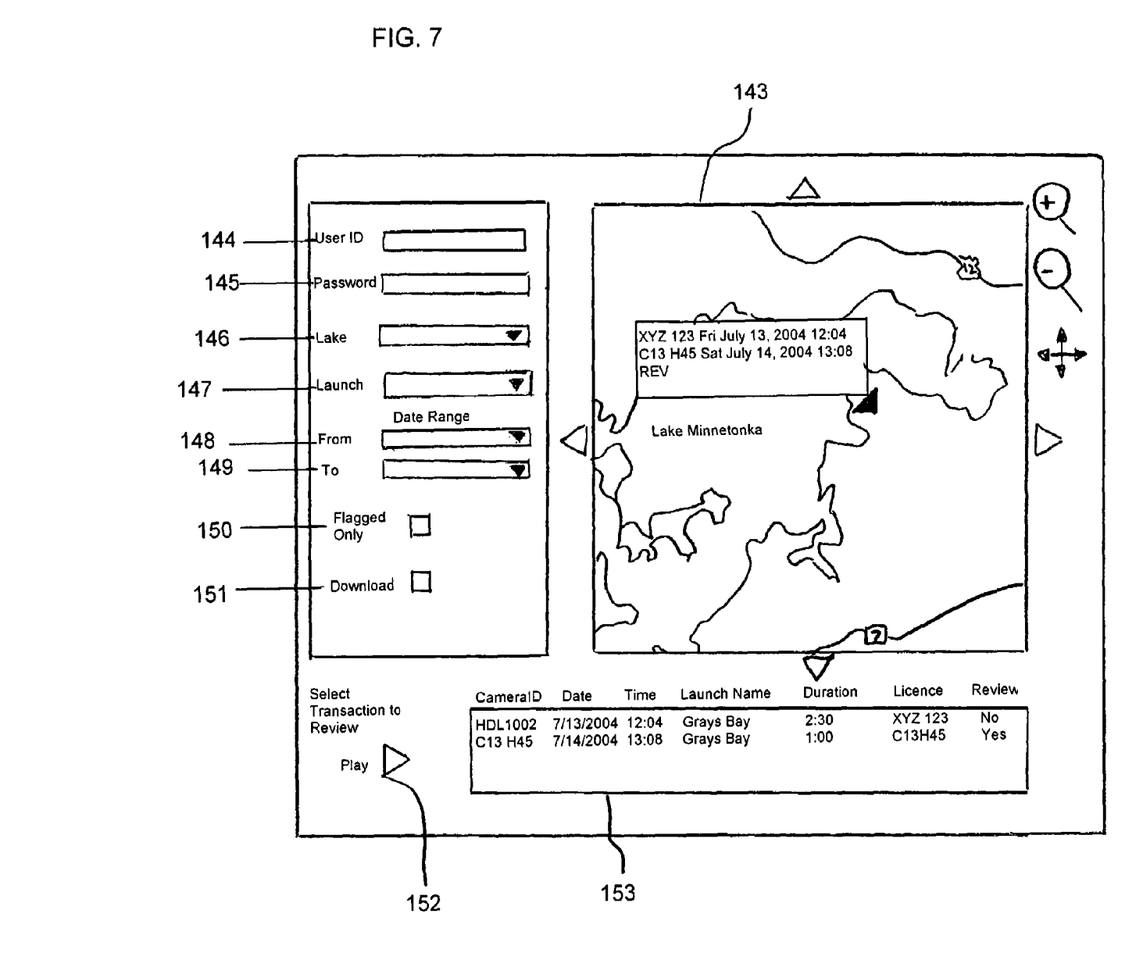
FIG. 7 is a diagram illustrating an exemplary graphical user interface for selectively viewing video clips and related information for different monitored outdoor sites.

FIG. 7 illustrates an example of a Web-based user interface according to one embodiment. User authentication is enabled by entering a User-ID and Password in fields 144 and 145, since not all users have access to every launch; this is maintained in a security clearance database. Once authenticated, the user is presented with a GIS view of the lake along with several launch transactions most recently occurring overlayed on the map. The user has the ability to zoom out and zoom in on the map to navigate to different launch locations or may simply select the launch name from the pull down menu in field 147 or the lake in field 146. The transaction scanner 131 that is running on monitoring center 78 picks up this flag and, upon finding the flag, it updates the user view of the GIS map showing summary data such as license plate, time/date, and highlighting in red if the image should be reviewed. Preferably, this information is superimposed over the geographic region where the video camera is located in window or frame display 143.

The suspicious flag in the database entry causes the corresponding summary transaction to be highlighted in red so that users can choose to review that video transaction first. The user has the ability to query for only flagged transactions 150 and view those summaries in a transaction selection window 153. For any transactions queried, the user can select one and elect to play it in a standard video pop-up window such as Microsoft's Windows Media Player. They may also download video clips to save them for other use such as for evidentiary purposes.

In one embodiment, one or more designated users can be notified via email, or pager, telephone, SMS text messaging, or other suitable method. The system can be configured to notify the designated user(s) in response to a selectable set of conditions, such as upon the receipt of a new video transaction, or upon the completion of video image analysis resulting in flagging a video transaction. Optionally, video images could be delivered over a broadband wireless network such as 3G for playback on a suitably equipped cellular telephone.

In one application, the remote video camera can be used with an AMS sensor to capture videos of boat launching or landing activities. This application is beneficial as it ensures that the owner of the boat removes invasive species vegetation or zebra mussels prior to entering into a body of water. With thousands of lakes in some states, remote locations, no power available, and sporadic usage, the advantages of this design become evident. Referring again to FIG. 4, the VMU 70 is securely installed in a concrete footing at a point of inspection. At this location the device is secured against all weather, electrically grounded, moisture resistant having been pressurized or had nitrogen injected into the enclosed space or had a buffered silica gel desiccant installed. In one embodiment, there may be smaller concrete guard posts at points around its exterior. A directional antenna 32 has been trained on the wireless access point 74. A generally permanent installation of this device provides a degree of required evidentiary credibility when video evidence is relied upon for law enforcement. In the activity indicated at 68, a boat launch takes place when a vehicle and boat trailer come within a certain distance of the magnetic sensor housed in the VMU 70. Once triggered, the video camera in the VMU 70 initiates communications to a local wireless access point 74, which is connected to the Internet 76. The VMU transmits its physical camera address along with capturing live action video for storage at the Monitoring center 78. Due to the positioning of the VMU and its incorporation of a magnetic sensor, it is able to capture entering and leaving events as it does not require to be triggered by where the video camera portal is pointing. In another embodiment, the wireless access point may store the video on a local server and transmit video clips in batches. In another embodiment, the VMU 70 may cache the video transactions locally which could later be retrieved by a person with a reading device at a convenient time to be transferred to the monitoring center 78. The monitoring center 78 performs the functions of analyzing and storing the video transaction described above and making this available for authorized web-browser access to a web server (not shown), which can store the metadata for the transaction which is overlaid on the GUI map.

Thus, aspects of the invention enable remote deployment of standalone monitoring technology in areas of interest without the assistance of wired power or communications. Power is utilized efficiently, capturing only those activities as they occur, and optionally analyzing the captured video information before presenting it to authorized viewers at a later time. Being able to harden the VMU against most vandalism while allowing it to operate in an unmanned fashion for long periods of time is beneficial. The ability of the system to process hours of video data to highlight key events for authorities to review provides significant efficiencies to monitoring personnel. Analyzing license plate information enables rapid identification of violators and collecting the information in a database provides the ability to identify repeat offenses. The video capturing of all user events supports local ordinances which in some instances require certain activities be performed (e.g. draining of live wells, removal of weeds within a certain area). Collecting natural resource usage information in a database facilitates trend analysis for establishing policies and rules. Identifying whether boat or motor vehicle registrations are current is another useful aspect of this application.

While the above description contains much specificity, these should not be construed as limitations on the scope of the invention, but rather as an exemplification of several of the preferred embodiments thereof. Many other variations are possible, as will be recognized by persons of ordinary skill in the relevant arts. For example, the housing of the circuit, camera, batteries, and antenna, could be dramatically altered to exist in a smaller form factor (e.g. a 4" diameter casing with an elongated or separate antenna and PV array) such that it could be rapidly installed, without a concrete footing, or even less obtrusively seen. The housing may be made of other materials than stainless steel, such as hardened plastics, or even disguised as a tree trunk. The dome may be made of many different types of clear or colored plastic materials designed to be weather and impact resistant and still transmit video and allow sunlight for solar power. The video camera could be any of a variety of commercially available cameras designed to capture video upon power-up and may have additional features such as Pan Tilt or Zoom, or operate in low-lux (nighttime) conditions. The means of wireless networking could be any broadband or radio technology standard such as high frequency 802.11b, g, or w that may emerge and allow for reliable video transmission to an Internet access point. Another application could utilize this invention as trail monitoring devices (e.g. to affirm no motorized vehicles are using a particular trail). Yet another application could deploy numerous devices at a border crossing to record unauthorized crossings.

Another type of embodiment includes at least two cameras at a given VMU or monitored site, one camera having a relatively wider field of vision directed to capturing any events of interest taking place, and a second camera having a narrower field of vision directed to capturing a still or moving or video sequence of human faces, such as an operator of a vehicle. In a related embodiment, the second camera can have optical or digital zoom capability, pan/tilt capability, or both.

The multiple cameras could be in the same VMU housing, or in different VMU housings and connected by a local wired or wireless network.

The microcontroller system would coordinate operation of the two cameras. In one embodiment, the microcontroller system would include some image processing capability for detecting the location of humans and directing the second camera to capture more detailed images of the humans (preferably, the head and face portions) while the first camera continues capturing the overall activity taking place at the monitored site. In a related embodiment, two-way communications between the VMU and the monitoring center are used to send video images captured by the first camera to the monitoring center for near-real-time image analysis, and to transmit control signals from the monitoring center back to the equipment at the monitored site to control operation of the second camera based on some of the image processing results.

The advantage of this type of embodiment is that the human surveillance video can be combined with the site monitoring video to enable identification of the operator/violator for purposes of meeting constitutional requirements for certain kinds of enforcement activities in certain jurisdictions.

It will of course be understood by those skilled in the art that the particular embodiment of the invention here presented is by way of illustration only; and is meant to be in no way restrictive; therefore numerous changes and modifications may be made, and the full use of equivalents resorted to, without departing from the spirit or scope of the invention as outlined in the appended claims.

What is claimed is:

1. A method of remotely monitoring an outdoor site, the method comprising:
   providing a self-contained video monitoring unit (VMU) at the outdoor site near ground elevation, including affixing a chassis of the VMU to a permanent mount, and providing a generally cylindrical housing enclosing the chassis, the housing being formed from an alloy that includes ferrous material;
   passively monitoring, from within the housing of the VMU, an ambient magnetic field at the outdoor site to detect a disturbance caused by a presence of a substantial ferrous object;
   in response to a detection of a disturbance in the ambient magnetic field,
   capturing video data by the VMU; and
   wirelessly transmitting, from the VMU, a signal representing at least a portion of the video data to a computer.

2. The method of claim 1, further comprising:
   providing at least one solar panel operably connected to the VMU for converting solar energy into electrical energy for powering the VMU.

3. The method of claim 1, further comprising monitoring at least one event sensor selected from the group consisting of:
   a motion sensor, an audio sensor, a mechanical vibration sensor, a radio frequency identification (RFID) reader, a light level sensor.

4. The method of claim 1, wherein the wirelessly transmitting of the signal representing the at least portion of the video data occurs via a computer network.

5. The method of claim 1, wherein the providing the VMU includes positioning a video camera of the VMU between about 1 and 5 feet above an elevation of a road or trail.

6. The method of claim 1, wherein capturing the video data by the VMU does not include storing, at one time, an entire set of the at least portion of the captured video data that is wirelessly transmitted.

7. The method of claim 1, wherein capturing the video data includes storing, at one time, the at least portion of the captured video data that is wirelessly transmitted.

8. The method of claim 1, wherein the wirelessly transmitting of the signal representing the at least portion of the video data is initiated immediately after the capturing of at least a first portion of the video data.

9. The method of claim 1, wherein capturing the video data includes capturing the video data in digital form.

10. The method of claim 1, wherein wirelessly transmitting a signal representing at least a portion of the video data to a computer includes transmitting the at least portion of the video data over the Internet.

11. The method of claim 1, wherein wirelessly transmitting a signal representing at least a portion of the video data signal includes embedding metadata with the at least portion of the video data.

12. The method of claim 11, wherein the metadata includes a unique VMU ID.

13. The method of claim 1, further comprising:
   receiving the video data by a remote node in the computer network via the computer network and storing the video data in association with a database record.

14. The method of claim 13, wherein storing the video data in association with a database record includes storing metadata in association with the database record, the metadata having at least one type of information selected from the group consisting of: a VMU ID, date/time information, a geographic location indicator, a geographic location type indicator, duration of video, license plate information, registration label information, and event detection flag.

15. The method of claim 13, further comprising:
   automatically processing the video data by a video analysis application to detect a presence of at least one of a set of predefined video image patterns associated with events of interest.

16. The method of claim 15, wherein automatically processing the video data uses a set of predefined image patterns associated with events of interest that includes at least one image pattern representing an event selected from the group consisting of: motor vehicle usage; transportation of aquatic vegetation; a presence of an item dangling from a motor vehicle, watercraft, or trailer; a presence of a license plate; and a presence of a registration label.

17. The method of claim 1, wherein passively monitoring an ambient magnetic field occurs while the VMU is operating in a low-power standby mode; and
   wherein in response to the detection of the disturbance in the magnetic field, exiting the low-power standby mode.

18. The system of claim 17, wherein the monitoring center includes a video processing application that analyzes the at least portion of the video sequence to detect a presence of at least one of a set of predefined video image patterns.

19. The system of claim 18, wherein the set of predefined image patterns include at least one image pattern representing an event selected from the group consisting of: motor vehicle usage; transportation of aquatic vegetation; a presence of an item dangling from a motor vehicle, watercraft, or trailer; a presence of a license plate; and a presence of a registration label.

20. A system for automatically monitoring a plurality of outdoor sites, the system comprising:
a video monitoring unit (VMU), installed at an outdoor site, and comprising:
a ruggedized housing fixed to a non-movable base that is situated on the ground, the ruggedized housing being formed from an alloy that includes ferrous material and having a generally cylindrical shape;
a video capture circuit situated within the housing,
a first event sensor circuit situated within the housing, the first event sensor circuit configured to passively detect changes in the ambient magnetic field external to the housing;
a radio transmitter circuit situated within the housing;
a controller circuit situated within the housing and electrically coupled with each of the video capture circuit, the first event sensor circuit, and the radio transmitter circuit; and
a power source situated within the housing and electrically coupled with each of the video capture circuit, the first event sensor circuit, the radio transmitter circuit, and the controller circuit, the power source enabling the VMU to operate independently of any external power source; wherein the controller circuit executes instructions that cause the VMU to:
operate in a video capture mode wherein the video capture circuit captures a video sequence of the corresponding outdoor site, and wherein the radio transmitter circuit transmits at least a portion of the video sequence to a receiver interfaced with a computer network.

21. The system of claim 20, wherein the non-movable base is a footing embedded in the ground.

22. The system of claim 20, wherein ruggedized housing includes a cover of transparent impact-resistant material and a secure openable portal that selectively provides access to the interior of the housing.

23. The system of claim 20, wherein the video capture circuit is part of a network-addressable digital camera module that includes a lens, an image sensor, an image processor electrically coupled with the image sensor, and a network interface electrically coupled with the image processor.

24. The system of claim 20, wherein the VMU includes a second event sensor, wherein the controller circuit of the VMU executes instructions that cause the VMU to recognize a triggering event based on an output from at least one of the first event sensor and the second event sensor.

25. The method of claim 24, wherein the second event sensor is situated remotely from the VMU and communicatively coupled with the VMU.

26. The system of claim 20, wherein the ruggedized housing is made from Schedule 40 stainless steel pipe, and wherein the first event sensor is situated substantially at the center of the housing.

27. The system of claim 20, wherein the radio transmitter is a part of the computer network.

28. The system of claim 20, wherein the VMU includes:
a solar power converter that is housed in the ruggedized housing and provides electrical energy collection and storage for the VMU.

29. The system of claim 20, further comprising:
at least one additional VMU situated at an outdoor site such that the system includes a plurality of VMUs situated at a plurality of different outdoor sites;
a monitoring center communicatively coupled with the computer network, wherein the monitoring center:
receives the at least portion of the video sequence via the computer network;
manages a database having items corresponding to video-captured events at any of the plurality of outdoor sites;
stores the received at least portion of the video sequence as an item associated with the database; and
provides access to the item via the computer network.

30. The system of claim 29, wherein the database items corresponding to video-captured events include time and date information and geographic location information related to the corresponding video-captured events.

31. The system of claim 20, wherein the controller circuit further causes the VMU to:
operate in a standby mode wherein the first event sensor monitors a portion of the corresponding outdoor site for an occurrence of at least one triggering event; and
initiate operation in the video capture mode in response to a detection of the at least one triggering event.

* * * * *